(12) United States Patent
Di Lullo et al.

(10) Patent No.: US 9,133,347 B2
(45) Date of Patent: Sep. 15, 2015

(54) ANTIFOULING COATING COMPOSITION

(75) Inventors: Claudio Argentino Di Lullo, Brampton Cumbria (GB); Ian Stuart Millichamp, Newcastle upon Tyne (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 13/994,637

(22) PCT Filed: Dec. 19, 2011

(86) PCT No.: PCT/EP2011/073160
§ 371 (c)(1),
(2), (4) Date: Jun. 14, 2013

(87) PCT Pub. No.: WO2012/084758
PCT Pub. Date: Jun. 28, 2012

(65) Prior Publication Data
US 2013/0289160 A1    Oct. 31, 2013

Related U.S. Application Data

(60) Provisional application No. 61/439,041, filed on Feb. 3, 2011.

(30) Foreign Application Priority Data

Dec. 21, 2010   (EP) .................................... 10196083

(51) Int. Cl.
C09D 5/16    (2006.01)
C09D 5/02    (2006.01)

(52) U.S. Cl.
CPC .............. *C09D 5/1662* (2013.01); *C09D 5/022* (2013.01); *C09D 5/027* (2013.01); *C09D 5/1687* (2013.01)

(58) Field of Classification Search
CPC .... C09D 5/022; C09D 5/1687; C09D 5/1662; C09D 5/027
USPC ....................................... 523/122
See application file for complete search history.

(56) References Cited

U.S. PATENT DOCUMENTS 5,545,823 A    8/1996    Kuo et al.
5,585,407 A    12/1996   Patel et al.

FOREIGN PATENT DOCUMENTS

| | | |
|---|---|---|
| CN | 1473892 | 2/2004 |
| EP | 0 204 456 | 12/1986 |
| EP | 0 779 304 | 6/1997 |
| EP | 1 958 991 | 8/2008 |
| GB | 457590 | 12/1936 |
| JP | 10-298455 | 11/1998 |
| JP | 2003-277680 | 10/2003 |
| JP | 2007-23243 | 2/2007 |
| JP | 2008-1804 | 1/2008 |
| JP | 2009-173914 | 8/2009 |
| KR | 2010-0115683 | 10/2010 |
| WO | 99/37723 | 7/1999 |
| WO | 02/02698 | 1/2002 |
| WO | 2004/018533 | 3/2004 |
| WO | 2005/005516 | 1/2005 |
| WO | 2006/077738 | 7/2006 |
| WO | 2007/127692 | 11/2007 |
| WO | 2010/018144 | 2/2010 |

OTHER PUBLICATIONS

European Search Report for EP Application No. 10196083.9-1217 mailed on Apr. 28, 2011.
International Search Report and Written Opinion for International Application No. PCT/EP2011/073160 mailed on Feb. 3, 2012.
International Preliminary Report on Patentability for International Application No. PCT/EP2011/073160 mailed on Feb. 7, 2013.
C. Solans et al., "Adsorption and Aggregation of Surfactants in Solution: Fundamentals and Applications", K.L. Mittal & D.O. Shah, 2002, p. 525.

*Primary Examiner* — Nathan M Nutter
(74) *Attorney, Agent, or Firm* — Kenyon & Kenyon LLP

(57) ABSTRACT

A process for making an antifouling coating composition comprising the following steps: a) preparation of a binder polymer in an organic solvent; b) emulsification of the binder polymer and the organic solvent into water; c) removal of all or part of the organic solvent from the emulsion; and d) formulation of the emulsion into a water-based anti-fouling coating composition.

17 Claims, 1 Drawing Sheet

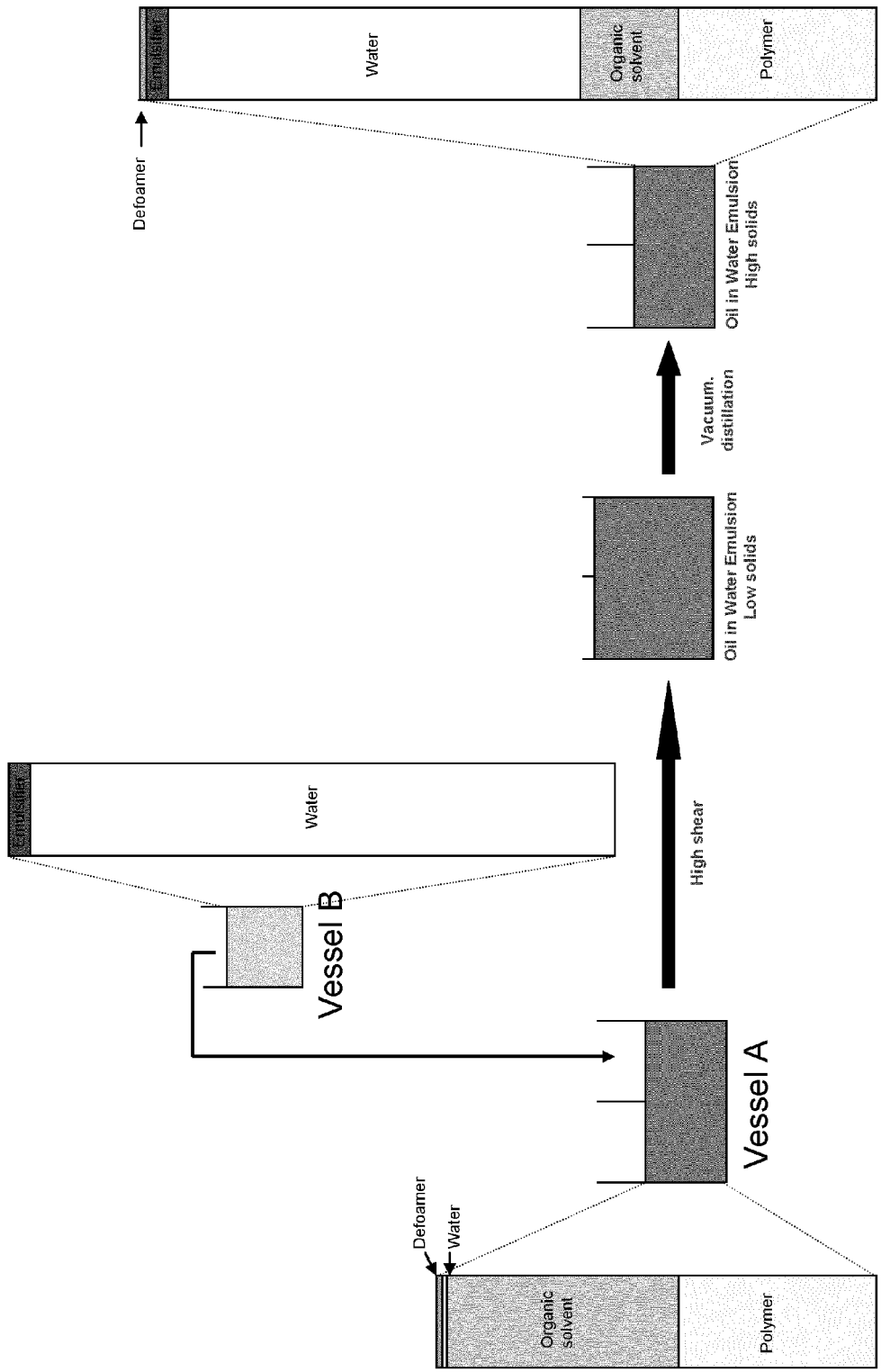
Diagram 1. Emulsification procedure (note that the defoamer and water in vessel A and the organic solvent in the final composition are optional components)

ANTIFOULING COATING COMPOSITION

REFERENCE TO RELATED APPLICATIONS

This application is the U.S. National Phase of PCT/EP2011/073160 filed on Dec. 19, 2011, and claims the benefit of European Application No. 10196083.9, filed on Dec. 21, 2010, and U.S. Provisional Application No. 61/439,041, filed on Feb. 3, 2011.

FIELD OF THE INVENTION

The present invention relates to a process for making an antifouling coating composition, the antifouling coating composition obtained from the process and the use of such an antifouling coating composition to coat a substrate.

BACKGROUND ART

Man-made structures such as boat hulls, buoys, drilling platforms, oil production rigs, and pipes which are immersed in water are prone to fouling by aquatic organisms such as green and brown algae, barnacles, mussels, and the like.

Such structures are commonly of metal, but may also comprise other structural materials such as concrete or wood. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use antifouling coatings, for instance as a top coat on ships' hulls, to inhibit the settlement and growth of marine organisms such as barnacles and algae, generally by release of a biocide for the marine organisms.

Many successful antifouling coatings in recent years have been "self-polishing copolymer" paints based on a polymeric binder to which leaving group moieties are chemically bound, and from which leaving group bonds to the polymer backbone are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the coating layer on the ship is washed out or eroded. Such paint systems are described for example in GB-A-1 457 590, EP779304, WO2005005516, WO200202698, WO2004018533 or WO201018144 and WO9937723.

Current marine solvent-borne antifouling coatings release significant volumes of organic solvent into the atmosphere upon coating application. This is harmful to the environment and will be legislated against increasingly in the coming years. The volatile organic content (VOC) of antifouling coatings is already restricted by legislation in many countries. For example, the European Solvents Emissions Directive limits the VOC to less than 270 g/kg—equivalent to about 450 g/l—for the overall emissions from shipyards which apply antifouling coatings compositions, whilst in California, USA an upper limit of 400 g/l for antifouling paints is in force.

Waterborne formulation offers the potential to significantly reduce the organic solvent content of antifouling coatings. For the purposes of the present invention, a waterborne antifouling coating composition means any such composition containing more than 10% of water by volume. Such coatings can also be referred to as water-based coatings. The waterborne compositions disclosed in this patent application typically have VOC<150 g/l.

Besides these VOC demands, antifouling coatings on ships should provide adequate antifouling protection and have a good film integrity, i.e. show almost no cracking and a good adhesion, particularly when applied to those parts of a vessel where the coating is alternately wet and dry, for instance at the waterline. The coating should be sufficiently hard, i.e. not soft or sticky, but it should not be brittle. Further, the coating should show hardly any so-called cold flow or plastic deformation, in other words, the film should not ripple when the ship moves in the water. Additionally, the coating composition needs to show a sufficiently short drying time. These characteristics are achieved by the compositions of the present invention.

JP2009173914 and WO2006/077738 and EP1958991 disclose waterborne antifouling systems prepared by latex polymerisation.

JP2007023243 discloses an aqueous antifouling coating composition which comprises an emulsion prepared by (i) preparing a polymer in an organic solvent, (ii) partially removing the solvent by distilling at atmospheric pressure and then (iii) mixing the polymer/solvent mixture with water. The emulsions that are described in JP2007023243 are water-in-oil emulsions. The reported viscosities of the emulsions in JP2007023243 vary between 1-6 poise, which is characteristic of a water-in-oil emulsion where the overall viscosity is controlled by the viscosity of the continuous phase (i.e. the polymer dissolved in the organic solvent). In contrast, water-in-oil emulsions (which have not been modified by addition of thickening agents) have a viscosity of around 0.1 poise (since water is the continuous phase). Further, it has been found by the inventors that the emulsions prepared as described in Examples P1 and P3 are unstable at ambient temperature when stored overnight.

JP2003277680 discloses a silyl polymer based system made via the synthesis of the silyl polymer in an organic solvent. This solvent is partially removed by distillation before emulsification of the silyl polymer into water.

A problem with current waterborne antifouling systems is that there is a reduction in mechanical strength and film properties when compared to solvent-borne systems. The particulate nature of these systems is not favourable to film coalescence resulting in voids in the dried paint film.

The problems noted above have been addressed by the waterborne coating of the current invention, which releases significantly less organic solvent into the atmosphere whilst maintaining good mechanical properties comparable to solvent-borne systems. Not only is this better for the environment but is beneficial to users of such paint, who will see the positive effects of reduced organic solvent emissions, both with respect to their successful compliance with regulations (avoidance of punitive fines), and with respect to the environmental impact and profile of their organisation.

SUMMARY OF THE INVENTION

According to a first aspect of the present invention there is provided a process for making an antifouling coating composition comprising the following steps:

a) preparation of a binder polymer in an organic solvent;
b) emulsification of the binder polymer and the organic solvent into water;
c) removal of part of the organic solvent from the emulsion; and
d) formulation of the emulsion into a water-based antifouling coating composition.

According to a second aspect of the present invention there is provided an antifouling coating composition comprising an oil-in-water emulsion, wherein the oil phase of the oil-in-water emulsion is a binder polymer optionally in an organic solvent, the antifouling coating composition being obtainable by the process according to the first aspect of the present invention.

An emulsion is one liquid (the "dispersed phase") dispersed in another liquid (the "continuous phase"). An oil-in-water emulsion is when an oil is the dispersed phase and water is the continuous phase, i.e. an oil is dispersed in water. A water-in-oil emulsion is when water is the dispersed phase and an oil is the continuous phase, i.e. water is dispersed in an oil. The process according to the first aspect of the invention produces an oil-in-water emulsion, wherein the dispersed phase (oil) is a binder polymer optionally in an organic solvent, and the continuous phase is water.

It has been found by the inventors that the achievable volatile organic content (VOC) of the oil-in-water emulsion as provided by the process according to the first aspect of the present invention is much lower than can be achieved from the equivalent water-in-oil emulsions. For example, the achievable VOCs of the water-in-oil emulsions, such as those disclosed in JP2007023243 are around 160 g/l, and it has been found by the inventors of the present invention that it is unlikely that the VOC could be reduced any further. In contrast, the process of the invention can be used to prepare oil-in-water emulsions having a much lower VOC, and in principle, down to 0 g/l.

Further, it has been found that waterborne antifouling systems prepared by the claimed process have superior mechanical strength and film properties when compared to current waterborne antifouling systems, and in particular systems comprising latices. In fact, the waterborne antifouling systems prepared by the process according to the first aspect of the present invention have good mechanical properties comparable to solvent-borne systems.

According to a third aspect of the present invention there is provided the use of the antifouling coating composition to coat a substrate.

The present inventors have realised that the process according to the first aspect of the present invention can be used to provide marine antifouling coatings of very low volatile organic content (VOC) without compromising on mechanical properties like other waterborne antifouling coatings.

DETAILED DESCRIPTION

Step a) of the process of the present invention is applicable to any binder chemistry suitable for use in anti-fouling coatings. Suitable binder systems can be either SPC (self-polishing copolymer) or non-SPC binder systems.

In one embodiment, the binder comprises a self-polishing copolymer having an acrylic backbone in the polymer. The SPC binder system may be selected from any one of the following: a metal (e.g. copper or zinc) acrylate system as described in EP779304, a silyl functional acrylic polymer (WO2005005516), a carboxylate—counterion functional acrylic system according to WO0202698, WO04018533 or WO201018144 or a quaternary ammonium or amine salt/carboxylate or sulfonate functional acrylic system as described in WO9937723. Typically the acrylic SPC is prepared by free radical polymerisation in an organic solvent medium. The metal acrylate systems are formed by reaction of a carboxylic acid functional acrylic polymer with metallic species such as copper acetate or zinc oxide.

Preferably a zinc acrylate binder system is used as this achieves excellent antifouling properties as well as low VOC and good mechanical properties.

Examples of non-SPC binder systems include binder systems that comprise rosin, modified rosin, or rosin derivatives as the active binder. These systems are also known as controlled depletion polymers (CDP) or soluble matrix paint systems. In an alternative embodiment, the binder system comprises an acrylic rosin material and rosin, modified rosin, or rosin derivatives.

Organic solvents that can be used to prepare the binder should be compatible with the binder, meaning that the binder should be soluble in the solvent. Examples of organic solvents that can be used, either as sole solvent or as mixtures, include aromatic solvents such as xylene, toluene and trimethylbenzene, alcohols such as n-butanol and isopropanol, ethers such as tetrahydrofuran and dioxane, esters such as butyl acetate and ketones such as methylisobutyl ketone and cyclohexanone.

Step b) is typically carried out by slowly adding an aqueous emulsifier solution to the resin solution (in organic solvent) under high shear. Phase inversion takes place during this addition (from water-in-oil to oil-in-water) resulting in a fine particulate polymer emulsion.

Prior to or during step b, an emulsifier and/or surfactant can be added to the binder solution in the organic solvent to facilitate the emulsification in water.

The emulsion may be formed by a one-shot addition of the emulsifier aqueous solution or it may be formed by adding an amount of emulsifier aqueous solution to the resin solution designed to form a water-in-oil emulsion, which may be stored in this form until required, and then converted to an oil-in-water form by addition of further emulsifier solution. This second emulsifier addition may comprise the same emulsifier or a different emulsifier having a higher value of hydrophilic-lipophilic balance.

The emulsion may also be formed by the phase inversion temperature (PIT) approach if appropriate emulsifiers, such as poly(ethylene oxide)/poly(propylene oxide) block copolymers surfactants (such as the Pluronic range of surfactants from BASF Aktiengesellschaft) are employed. These surfactants are hydrophilic at ambient temperature but become lipophilic when heated due to the loss of water of hydration from the ethylene oxide repeat units. Therefore, whilst oil-in-water emulsions are favoured at ambient temperature, when heated the system can invert to a water-in-oil conformation. If the system is stirred and rapidly cooled the inversion back to oil-in-water passes through a critical temperature, the phase inversion temperature (PIT) where the interfacial tension is very low so that droplet break-up requires very little energy. If the cooling is performed rapidly enough through this point the resultant particle size is smaller than achieved by the conventional emulsification route (see C. Solans et al in 'Adsorption and Aggregation of Surfactants in Solution: Fundamentals and Applications'—K. L. Mittal & D. O. Shah p. 525 [2002]).

The emulsification is preferably carried out on a high speed disperser using the phase inversion approach but the emulsion may also be formed by use of homogenisation equipment e.g. a rotor-stator homogeniser such as a colloid mill or via membrane emulsification, or may be assisted by ultrasonic means, or may involve microfluidic droplet emulsion techniques, or may employ extrusion technology.

Suitable emulsifying surfactants include poly(ethylene oxide)-block-poly(propylene oxide)-block-poly(ethylene oxide) polymers such as the Pluronic range of surfactants manufactured by BASF Aktiengesellschaft or the Synperonic range manufactured by Uniqema Inc; Polysorbate surfactants such as poly(ethylene oxide) sorbitan fatty acids; aliphatic ethers of poly(ethylene oxide) such as the 'Brij' range of compounds available from Croda International plc; carboxylic acid functional polymeric surfactants such as Orotan 731A manufactured by Rohm and Haas/Dow Chemical Company, anionic sulfate or sulfonate functional surfactants such as Aerosol OT from Cytec Industries, and Acetylenic diol surfactants such as Surfynol 104 manufactured by Air Products and Chemical Inc.

Step c) may be carried out by any appropriate means of solvent removal such as by evaporation at atmospheric or reduced pressure, by solvent extraction techniques or by steam stripping. In one embodiment of the invention this step is performed under partial vacuum with mechanical mixing. In this process a mixture of water and organic solvent is removed (due to azeotrope formation) to increase the solids content.

All of the organic solvent may be removed but preferably a proportion of organic solvent is deliberately left in the emulsion in order to aid film formation properties. Without wishing to be bound by theory it is thought that the presence of the undistilled organic solvent is beneficial in film drying and coalescence and may even act to promote inversion of the system, from oil-in-water to water-in-oil, during the drying process. Thus the film would act more like a solvent-borne system during its final drying stages, leading to good film coalescence.

It has been found that for some resins it is beneficial to add a further amount of surfactant to the emulsion, prior to the vacuum distillation. This limits increases in particle size during the distillation. It is presumed that the additional stabilisation (steric or electrostatic) acts to reduce the tendency for particles to undergo coalescence.

Step d) is preferably performed by forming an initial millbase of pigments/biocides in water (high shear treatment in the presence of suitable surfactants) and then, at low shear, either adding the emulsion to the stirred millbase or adding the millbase to the stirred emulsion.

By this route, a very low VOC coating composition is produced, which has a much lower VOC than standard solvent-borne antifouling coatings.

The composition also has an advantage over waterborne antifouling coatings as currently used in the Yacht market, in that these latter coatings are generally based on standard latex binders that are essentially unreactive in seawater and which therefore rely on diffusion of biocide to render antifouling performance.

The waterborne coatings of this patent application have been found to show good antifouling performance which is on a par with standard commercial (solvent-borne) antifouling coatings. Self-polishing performance has been found to be similar to a solvent-borne comparative equivalent coating. This was an unexpected result as it would be expected that the presence of hydrophilic emulsifier and pigment dispersing agents in the waterborne system would act to increase polishing rate. Additionally, the paint showed no loss of film integrity (no development of cracks or detachment) during a wet/hot—cold/dry cycling test suggesting that film properties of the waterborne coating are similar to those of the solvent-borne equivalent coating. This was an unexpected result as it would again be expected that the presence of the emulsifier and pigment dispersing agents in the waterborne system would act to compromise film properties due to enhanced hydrophilicity, leading to greater ingress of water during the immersion part of the cycle, leading to greater film internal stress and loss of film integrity.

SPC antifouling coatings that are based on acrylic copolymers normally contain groups capable of hydrolysing, dissociating, or undergoing ion-exchange in seawater. Moreover, many of these acrylic copolymers are acid functional polymers whose acid groups are blocked by groups capable of hydrolysing, dissociating or undergoing ion-exchange in seawater to leave a polymer soluble or dispersible in seawater.

Examples of such antifouling coatings are disclosed in EP0204456 and EP779304. The binder used in the coating compositions comprises an acrylic backbone bearing at least one terminal group of the formula:

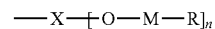

wherein X represents

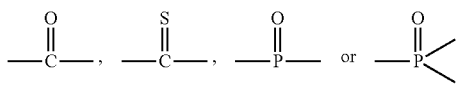

M is a metal selected from, e.g., zinc, copper and tellurium; n is an integer of 1 to 2; R represents an organic residue selected from

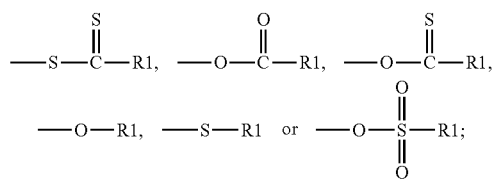

and R1 is a monovalent organic residue.

Usually the binder is mixed with a biocide for aquatic organisms.

Commercially successful antifouling coating compositions of this type most commonly comprise a binder in which X is

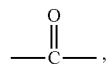

M is copper or zinc, R represents

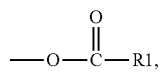

and the binder is mixed with cuprous oxide and a biocidal compound such as copper pyrithione or zinc pyrithione.

Recently, antifouling coating compositions have been developed containing a biocide and an acid-functional film forming polymer whose acid groups are blocked by groups capable of hydrolyzing, dissociating or exchanging with seawater species to leave a polymer soluble in seawater. Said acid-functional film forming polymer comprises quaternary ammonium and/or quaternary phosphonium groups bound to the backbone of the polymer, which are neutralised by counter-ions consisting of the anionic residue of an acid having an aliphatic, aromatic, or alkaryl hydrocarbon group comprising 6 or more carbon atoms. Such coating compositions are described in WO200202698 and WO2004018533.

Other self-polishing copolymer systems contain polymers bearing silyl ester groups, as described in WO2005005516, or sulfonic acid, acid sulphate ester, phosphonic acid or acid phosphate ester groups neutralised by an amine containing at least one aliphatic hydrocarbon group having 8-25 carbon atoms, as described in WO9937723.

The acrylic copolymer is built up from at least two, preferably 2-5 different acrylic monomers—and optionally one or more other unsaturated monomers—in order to achieve the optimum balance of properties. Preferably 1 to 99 mol %, more preferably 5 to 95 mol %, more preferably 5 to 75 mol %, even more preferably 7 to 70 mol %, and most preferably 10 to 65 mol % of the total number of monomer units in the acrylic copolymer contain groups capable of hydrolysing, dissociating, or undergoing ion-exchange in seawater. These groups can be present on the monomers prior to polymerisation, or can be introduced on the acrylic copolymer after the polymerisation. The acrylic copolymer should contain a sufficient amount of these groups to ensure that the copolymer undergoes hydrolysis, dissociation, or ion-exchange reactions in seawater to generate a water-soluble or water-dispersible framework that can be washed out, eroded or polished away from the paint layer surface. Suitable comonomers, which do not undergo hydrolysis, dissociation or ion-exchange in seawater, include (meth)acrylate esters such as methyl (meth)acrylate, ethyl (meth)acrylate, butyl (meth)acrylate, 2-ethylhexyl(meth)acrylate, 2-hydroxyethyl(meth)acrylate, cyclohexyl(meth)acrylate, methoxyethyl (meth)acrylate, isobornyl(meth)acrylate, poly(ethylene oxide) functional (meth)acrylate monomers such as poly(ethylene oxide) (n=8) monoalkyl ether(meth)acrylate, methoxyethyl (meth)acrylate, ethoxyethyl (meth)acrylate propoxyethyl (meth)acrylate, butoxyethyl (meth)acrylate or N-vinyl pyrrolidone or styrene and its substituted derivatives.

Examples of groups capable of hydrolysing, dissociating, or undergoing ion-exchange in seawater are:
(A) Groups of the formula —X—[—O-M-R]$_n$ wherein M is a metal of Group Ib, IIa, IIb, IIIa, IIIb, IVa, IVb, Va, VIa, VIb, VIIa, and VIII of the Periodic Table with a valency of 2 or more; and n is an integer of 1 to 2; R represents an organic residue selected from

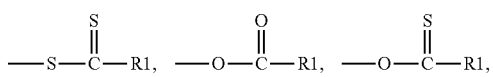

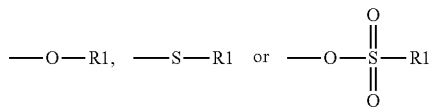

R1 is a monovalent organic residue and
X represents

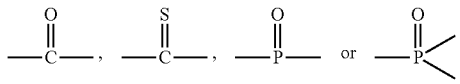

The use of one or more of Ca, Mg, Zn, Cu, Te, Ba, Pb, Fe, Co, Ni, Si, Ti, Mn, Al, Bi, and Sn is preferred. The use of one or more of Cu, Zn, and Te is more preferred, with the use of Cu and/or Zn being even more preferred.

Preferably, M is copper or zinc and R represents

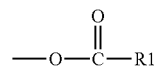

and X represents

and n=1.

The organic residue R is preferably derived from an aliphatic, aromatic, linear, branched, alicyclic or heterocyclic organic acid. It is particularly preferred for R to be the residue of one or more of the following acids: benzoic acid, salicylic acid, 3,5-dichlorobenzoic acid, lauric acid, stearic acid, nitrobenzoic acid, linoleic acid, ricinoleic acid, 12-hydroxy stearic acid, fluoroacetic acid, pulvic acid, O-cresotinic acid, naphthol-1-carboxylic acid, p-oxy-benzoic acid, chloroacetic acid, dichloroacetic acid, naphthenic acid, p-phenyl benzoic acid, lithocholic acid, phenoxy acetic acid, 2,4-dichlorophenoxy acetic acid, oleic acid, versatic acid, nicotinic acid, penicillic acid and the like, or a diterpenoid acid having an abietane, pimarane, isopimarane or labdane skeleton such as, for example, abietic acid, neoabietic acid, levopimaric acid, dextropimaric acid, sandaracopimaric acid, and the like which may be used individually or in combination.

(B) Ammonium and/or phosphonium groups which are neutralised, in other words blocked or capped, by one or more counter-ions. These counter-ions consist of the anionic residue of an acid having an aliphatic, aromatic, or alkaryl hydrocarbon group comprising at least 6, preferably 6-50, more preferably 6-20 carbon atoms.

The blocked ammonium and/or phosphonium group may be quaternary, tertiary, secondary, or primary. Preferably, it has the following structure:

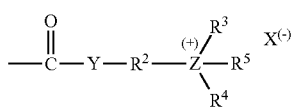

wherein Y is O or NH, Z is N or P, $R^2$ is a $C_2$-$C_{12}$ divalent hydrocarbon group, preferably a $C_2$-$C_8$ divalent hydrocarbon group, more preferably a $C_2$-$C_4$ divalent hydrocarbon group, $R^3$, $R^4$, and $R^5$ independently represent a hydrogen atom or an alkyl group, preferably a $C_1$-$C_6$ alkyl group, more preferably a methyl, or an optionally substituted phenyl group, and X is the anionic residue of an acid having an aliphatic, aromatic, or alkaryl hydrocarbon group comprising at least 6 carbon atoms.

(C) Silyl ester groups, such as trimethylsilyl-, triethylsilyl-, tri-n-propylsilyl-, triisopropylsilyl-, tri-n-butylsilyl-, tri-isobutylsilyl-, tri-tert-butylsilyl-, tri-n-amylsilyl-, tri-n-hexylsilyl-, tri-n-octylsilyl-, tri-n-dodecylsilyl-, triphenylsilyl-, tri-p-methylphenylsilyl-, tribenzylsilyl-, dimethylphenylsilyl-, dimethylcyclohexyl-, ethyldimethylsilyl-, n-butyldimethylsilyl-, t-butyldimethylsilyl-, diisopropyl-n-butylsilyl-, n-octyldi-n-butylsilyl-, diisopropylstearylsilyl-, dicyclohexylphenylsilyl-, t-butyldiphenylsilyl-, and lauryldiphenylsilyl- groups.

(D) Sulfonic acid, acid sulphate ester, carboxylic acid, phosphonic acid or acid phosphate ester groups neutralised by (i) an amine containing at least one aliphatic hydrocarbon group having 8-25 carbon atoms, (ii) a quaternary ammonium group, and/or (iii) a quaternary phosphonium group. The leaving moiety may possess biocidal properties. Examples of biocidal quaternary ammonium groups are trioctylmethyl ammonium and dicecyldimethyl ammonium.

Additionally, the antifouling coating binder may comprise a polymer bearing more than one type of group capable of hydrolysing, dissociating, or undergoing ion-exchange in seawater or the binder may comprise a blend of two or more polymers each having differing groups capable of hydrolysing, dissociating or undergoing ion-exchange in seawater.

Where the antifouling coating composition comprises an ingredient having biocidal properties, this can be a pigment, or a mixture of pigments, having biocidal properties. Examples of inorganic biocides include copper oxides, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis(N-cyclohexyl-diazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl)pyridine, 2-methylthio-4-butylamino-6-cyclopropylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tolylsulphone, N-cyclopropyl-N'-(1,1-dimethylethyl)-6-(methylthio)-1,3,5-triazine-2,4-diamine, 3-iodo-2-propynyl butyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethylpyrrole (tralopyril), and a furanone, such as 3-butyl-5-(dibromomethylidene)-2(5H)-furanone, and mixtures thereof, and quaternary ammonium salts such as didecyldimethylammonium chloride and an alkyldimethylbenzylammonium chloride and mixtures thereof. The biocide usually needs to be treated with a dispersing agent to generate a water-dispersible composition. This treatment can be performed either prior to coating formulation thus resulting in an isolated dispersed biocide, or it can be performed during the coating formulation by mixing the biocide with dispersing agent along with the other paint components.

The compositions of this invention which comprise as binder an acrylic SPC can provide controlled release of biocide via reaction of the active monomer repeat unit moieties with sea water ions which generates a surface zone of water soluble polymer which 'polishes' away from the surface with time of exposure. This mechanism is able to give a constant biocide release rate over a long time period (3 to 5 years) as opposed to the waterborne antifouling coatings as currently used in the Yacht market, which are generally based on standard latex binders which are substantially unreactive in seawater and which therefore rely on diffusion of biocide to render antifouling performance and which are known to be generally incapable of fouling control for a period of time longer than 2 to 3 years.

Furthermore, the biocide may optionally be wholly or partially encapsulated, adsorbed, absorbed, supported or bound. Certain biocides are difficult or hazardous to handle and are advantageously used in an encapsulated or adsorbed or absorbed or supported or bound form. Additionally, encapsulation, adsorption, absorption, support or binding of the biocide can provide a secondary mechanism for controlling biocide leaching from the coating system in order to achieve an even more gradual release and long lasting effect.

Additional components which may be added to the compositions include coalescing agents, co-solvents and freeze-thaw stabilizing co-solvent additives, thickening and anti-settlement agents, defoaming additives, non-biocidal pigment fillers, colouring pigments, hydrophobic or hydrophilic fluids, in-can biocides/preservatives, wetting agents and flow promoting agents.

Examples of suitable coalescing agents include Texanol (2,2,4-trimethyl-1,3-pentanediol monoisobutyrate), Dowanol DPnB (dipropyleneglycol n-butyl ether), 2(2-methoxyethoxy)ethanol, benzyl alcohol, butanol, mono and dialkyl ethers of mono and diethylene glycol and mono and dipropylene glycol, for example ethylene glycol mono n-butyl ether and diethyleneglycol dibutyl ether.

Examples of suitable co-solvents and freeze-thaw stabilizing co-solvent additives include propane-1,2-diol, propylene glycol diacetate, dipropylene glycol dimethyl ether and Rhodoline FT100, a freeze-thaw stabilizing additive available from the Rhodia company. Coalescing agents and co-solvents may also be added during the emulsification procedure, either to the initial polymer organic solvent solution or to the emulsion after the organic solvent removal has been performed.

Examples of suitable thickening agents include non-associative types such as Bentone clays, Attapulgite, hydroxyethyl cellulose (HEC) and its derivatives, silicas, kaolins and metal chelates, and associative types such as hydrophobically modified ethoxylate urethanes (HEUR), polyether polyols, hydrophobically modified alkali swellable/soluble emulsions (HASE), hydrophobically modified HECs. Natural thickening additives such as casein, alginates, seaweed extracts, starches and gums may also be used. Suitable anti-settlement agents include Disparlon AQ-600 supplied from Kusumoto Chemical Ltd.

Examples of suitable defoaming additives include hydrocarbon based compositions such as Foamaster NDW as manufactured by Cognis Corporation, silicone types such as Byk 022 from BYK-Chemie GmbH and poly(ethylene oxide)-block-poly(propylene oxide)-block-poly(ethylene oxide) polymers having relatively short poly(ethylene oxide) blocks such as Pluronic PE10100 from BASF Aktiengesellschaft.

Examples of suitable non-biocidal pigment fillers include slightly seawater-soluble compounds such as zinc oxide and barium sulphate, and seawater-insoluble compounds such as fillers and colouring pigments, e.g., talc, titanium dioxide, ferric oxide, phthalocyanine compounds, and azo pigments. Examples of suitable hydrophobic or hydrophilic fluids include silicone oils, fluorosilicone polymers and poly(ethyleneglycol).

Examples of suitable in-can preservatives include the Acticide range of isothiazoline compounds from Thor Chemicals. Examples of suitable wetting agents include silicone types such as Byk 346, a polyether modified dimethylpolysiloxane available from BYK-Chemie GmbH, and non-silicone types such as Aerosol OT (Sodium dioctyl sulfosuccinate) available from Cytec Industries Inc. Examples of suitable flow promoting agents include Byk 349, a polyether modified siloxane from BYK-Chemie GmbH.

Other components which can be added include plasticizers and Rosin or its derivatives and/or a polymer that is substantially free of groups capable of hydrolysing, dissociating, or undergoing ion-exchange in seawater. These will preferably be used in their dispersed or emulsified form.

The Rosin material is preferably rosin, particularly wood rosin or alternatively tall rosin or gum rosin. The main chemical constituent of rosin is abietic acid. The rosin can be any of the grades sold commercially and can alternatively be a rosin derivative, for example a maleinised or fumarised rosin, hydrogenated rosin, formylated rosin or polymerised rosin, or a rosin metal salt such as calcium, magnesium, copper or zinc rosinate. Examples of water dispersions of rosin materials are the 'Tacolyn' range of products from the Eastman Chemical Company.

As examples of suitable polymers or resins that are substantially free of groups capable of hydrolysing, dissociating, or undergoing ion-exchange in seawater that are insoluble in seawater the following compounds may be mentioned: modified alkyd resins, epoxy polymers, epoxy esters, epoxy urethanes, polyurethanes, linseed oil, castor oil, soybean oil, and derivatives of such oils, vinyl ether polymers, for example a poly(vinyl alkyl ether), such as polyvinyl isobutyl ether, or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, and a vinyl acetate polymer such as polyvinyl acetate or a vinyl acetate/vinyl chloride copolymer.

It was found that the antifouling coating composition prepared according to the process of the present invention shows a particle size and a particle size distribution that allows for favourable film integrity, and good mechanical and antifouling properties.

The VOC level of the composition is preferably below 250 g/l, more preferably below 200 g/l, even more preferably below 150 g/l, and most preferably below 125 g/l. The VOC level can be calculated in accordance with ASTM standard D 5201-01.

When a value is given for the viscosity of a coating composition according to the present invention, reference is made to the high shear viscosity measured using a cone and plate viscometer in accordance with ASTM standard D 4287-00.

The antifouling coating composition according to the present invention is very suitable for use in preventing fouling in marine and freshwater applications. The coating composition can be used for both dynamic and static structures, such as ship and boat hulls, buoys, drilling platforms, oil production rigs, pipes, fish nets, fish cages and other aquaculture apparatus and the like which are wholly or partially immersed in water either permanently or intermittently.

When applied to the exterior portion of a ship or boat hull, the coating composition of the present invention is normally applied as a topcoat. As such it can be applied in the normal coating scheme for new build vessels and also for maintenance and repair of existing vessels.

The invention will now be elucidated with reference to the following examples. These are intended to illustrate the invention but are not to be construed as limiting in any manner the scope thereof.

Emulsion Preparation Example 1

Preparation of Emulsion of Zinc Acrylate Polymer

A zinc acrylate polymer was prepared by the reaction of zinc oxide and naphthenic acid (acid value 200 mgKOH/g) with a carboxylic acid functional acrylic copolymer based on the monomers; Acrylic acid (18.4 mol %), ethyl acrylate (80.35 mol %) and, methoxy polyethyleneglycol methacrylate (MPEG350) (1.25 mol %). These components were mixed at a 1:1:1 molar ratio (Zinc oxide:Naphthenic acid:polymer carboxylic acid groups) in xylene/n-butanol (4:1 weight ratio) and heated and stirred at 95° C. until a clear solution was obtained resulting in a solution of zinc acrylate polymer of 45 wt % in xylene/n-butanol/water (43.3:10.8:0.9 wt %).

Emulsification of this solution was carried out as illustrated in diagram 1. The zinc acrylate solution (400 g) and defoaming agent Foamaster NDW (Cognis Corporation) (5.7 g) were placed in vessel A and stirred at high shear on a Dispermat laboratory high speed disperser. A pre-prepared solution of poly(ethylene oxide)-block-poly(propylene oxide)-block-poly(ethylene oxide) surfactant (emulsifier) (Genapol PF manufactured by Clariant International Ltd) (20 g) in water (533 g) plus ammonium hydroxide (35% solution) (2 g) was then fed into the polymer mixture over 60 minutes.

A marked drop in viscosity occurred when the system underwent phase inversion from water-in-oil to oil-in-water emulsion. The emulsion was stirred for 1 minute after the feed end then left to stand for at least 1 hour for any foam to subside. Then it was passed through an 80 μm nylon mesh.

This emulsion (900 g) was then placed into a four necked flange top flask equipped with a mechanically-driven anchor stirrer, electronic temperature controller and probe and a stillhead/condenser/receiver set-up along with an amount of Orotan 731A (Rohm and Haas/Dow Chemical Company) (37.6 g of 25 wt % solution in water). A manometer was attached to the vacuum line. The flask and contents were weighed before the start of the distillation so that the course of the distillation could be monitored by weight at intervals.

The emulsion was stirred at a moderate speed and heated to 40° C. Vacuum was then gradually applied until a steady rate of distillation was observed. The manometer reading was around 35 mbar under these conditions.

The final emulsion, after removal of 28.5% of the initial total mass as distilled water/solvent mix, was allowed to cool then passed through 80 μm nylon mesh. Non volatile content was determined, by the method of IS03251, as 27.7 wt % (theoretical 29.2%). VOC was calculated to be 128 g/kg. Average particle size was determined by use of a Malvern Mastersizer equipment to be 2.4 μm. Viscosity was determined by ICI Cone & Plate viscometer to be 0.08 poise. The emulsion had a milky white opaque appearance.

Emulsion Preparation Example 2

Preparation of Emulsion of Zinc Acrylate Polymer

A zinc acrylate polymer was prepared by the reaction of zinc oxide and naphthenic acid (acid value 200 mgKOH/g) with a carboxylic acid functional acrylic copolymer based on the monomers; Acrylic acid (16.8 mol %)/Ethyl acrylate (73.5 mol %), methoxy polyethyleneglycol methacrylate (MPEG350) (1.3 mol %) and cyclohexyl methacrylate (8.4 mol %). These components were mixed at a 1:1:1 molar ratio (zinc oxide:naphthenic acid:polymer carboxylic acid groups) in xylene/n-butanol (4:1 weight ratio) and heated and stirred at 95° C. until a clear solution was obtained resulting in a solution of zinc acrylate polymer of 48.6 wt % in xylene/n-butanol/water (41.2:9.3:0.9 wt %).

Emulsification of this solution was carried out as illustrated in diagram 1. The zinc acrylate solution (450 g) and defoaming agent Foamaster NDW (Cognis Corporation) (6.4 g) were placed in vessel A, along with xylene (18.9 g), and stirred at high shear on a Dispermat laboratory high speed disperser. A pre-prepared solution of poly(ethylene oxide)-block-poly (propylene oxide)-block-poly(ethylene oxide) surfactant (emulsifier) (Genapol PF manufactured by Clariant International Ltd) (22.5 g) in water (600 g) plus ammonium hydroxide (35% solution) (2.25 g) was then fed into the polymer mixture over 60 minutes.

A marked drop in viscosity occurred when the system underwent phase inversion from water-in-oil to oil-in-water emulsion. The emulsion was stirred for 1 minute after the feed end then left to stand for at least 1 hour for any foam to subside. Then it was passed through an 80 μm nylon mesh.

This emulsion (1,050.0 g) was then placed into a four necked flange top flask equipped with a mechanically-driven anchor stirrer, electronic temperature controller and probe and a stillhead/condenser/receiver set-up along with an amount of Orotan 731A (Rohm and Haas/Dow Chemical Company) (45.9 g of 25 wt % solution). A manometer was attached to the vacuum line. The flask and contents were weighed before the start of the distillation so that the course of the distillation could be monitored by weight at intervals.

The emulsion was stirred at a moderate speed and heated to 40° C. Vacuum was then gradually applied until a steady rate of distillation was observed. The manometer reading was around 35 mbar under these conditions.

The final emulsion, after removal of 29.5% of the initial total mass as distilled water/solvent mix, was allowed to cool then passed through 80 μm nylon mesh. Non volatile content was determined, by the method of ISO3251, as 31.8 wt % (theoretical 31.5%). VOC was calculated to be 102.9 g/kg. Average particle size was determined by use of a Turbiscan equipment to be 2.2 μm. Viscosity was determined by ICI Cone & Plate viscometer to be 0.10 poise. The emulsion had a milky white opaque appearance.

Emulsion Preparation Example 3

Preparation of Emulsion of Zinc Acrylate Polymer

A zinc acrylate polymer was prepared by the reaction of zinc oxide and naphthenic acid (acid value 200 mgKOH/g) with a carboxylic acid functional acrylic copolymer based on the monomers; Acrylic acid (25.0 mol %), Ethyl acrylate (62.9 mol %), Cyclohexyl methacrylate (9.6 mol %) and methoxy polyethyleneglycol methacrylate (MPEG350) (2.5 mol %). These components were mixed at a 1:1:1 molar ratio (zinc oxide:naphthenic acid:polymer carboxylic acid groups) in xylene/n-butanol (4:1 weight ratio) and heated and stirred at 95° C. until a clear solution was obtained resulting in a solution of zinc acrylate polymer of 45 wt % in xylene/n-butanol/water (41.7:12.3:1.0 wt %).

Emulsification of this solution was carried out as illustrated in diagram 1. The zinc acrylate solution (150 g) and defoaming agent Foamaster NDW (Cognis Corporation) (2.0 g) were placed in vessel A and stirred at high shear on a Dispermat laboratory high speed disperser. A pre-prepared solution of poly(ethylene oxide)-block-poly(propylene oxide)-block-poly(ethylene oxide) surfactant (emulsifier) (Genapol PF manufactured by Clariant International Ltd) (7.5 g) in water (200 g) plus ammonium hydroxide (35% solution) (0.75 g) was then fed into the polymer mixture over 60 minutes.

A marked drop in viscosity occurred when the system underwent phase inversion from water-in-oil to oil-in-water emulsion. The emulsion was stirred for 1 minute after the feed end then left to stand for at least 1 hour for any foam to subside. Then it was passed through an 80 μm nylon mesh.

This emulsion (170 g) was then placed into a four necked flange top flask equipped with a mechanically-driven anchor stirrer, electronic temperature controller and probe and a stillhead/condenser/receiver set-up. The flask and contents were weighed before the start of the distillation so that the course of the distillation could be monitored by weight at intervals.

The emulsion was stirred at a moderate speed and heated to 40° C. Vacuum was then gradually applied until a steady rate of distillation was observed.

The final emulsion, after removal of 28.6% of the initial total mass as distilled water/solvent mix, was allowed to cool then passed through 80 μm nylon mesh. VOC was calculated to be 138.5 g/kg. Average particle size was determined by use of a Malvern Mastersizer equipment to be 3.0 μm. Viscosity was determined by ICI Cone & Plate viscometer to be 0.06 poise. The emulsion had a milky white opaque appearance.

Emulsion Preparation Example 4

Preparation of Emulsion of Copper Acrylate Polymer

The copper acrylate polymer comprised an acrylic acid copolymer substantially in accordance with Production Example 1 of EP0779304-A1 in which the acrylic acid units are blocked by copper bound to naphthenic acid residues.

The polymer solution (NVC 45 wt %) was emulsified as illustrated in diagram 1. Copper acrylate solution (150 g) and defoaming agent Foamaster NDW (Cognis Corporation) (3 g) were placed in vessel A and stirred at high shear on a Dispermat laboratory high speed disperser. A pre-prepared solution of poly(ethylene oxide)-block-poly(propylene oxide)-block-poly(ethylene oxide) surfactant (emulsifier) (Genapol PF manufactured by Clariant International Ltd) (11.3 g) in water (200 g) plus ammonium hydroxide (35% solution) (0.75 g) was then fed into the polymer mixture over 60 minutes.

A marked drop in viscosity occurred when the system underwent phase inversion from water-in-oil to oil-in-water emulsion. The emulsion was stirred for 1 minute after the feed end then left to stand for at least 1 hour for any foam to subside. Then it was passed through an 80 μm nylon mesh.

This emulsion (170 g) was then placed into a four necked flange top flask equipped with a mechanically-driven anchor stirrer, electronic temperature controller and probe and a stillhead/condenser/receiver set-up. The flask and contents were weighed before the start of the distillation so that the course of the distillation could be monitored by weight at intervals.

The emulsion was stirred at a moderate speed and heated to 40° C. Vacuum was then gradually applied until a steady rate of distillation was observed.

The final emulsion, after removal of 35.2% of the initial total mass as distilled water/solvent mix, was allowed to cool then passed through 80 µm nylon mesh. A pale green opaque emulsion was given. Non volatile content was determined, by the method of IS03251, as 36.2 wt % (theoretical 35.5%). VOC was calculated to be 104 g/kg. Particle size was determined by optical microscopy of the diluted emulsion to be substantially in the range of 1-15 µm. Viscosity was determined by ICI Cone & Plate viscometer to be 0.22 poise.

Emulsion Preparation Example 5

Preparation of Emulsion of a Quaternary Ammonium

Sulfonate Counterion Functional Polymer

The quaternary ammonium—sulfonate counterion functional acrylic polymer was prepared in accordance with the method described in WO201018144-A1 (General Procedures—Polymer Preparation and Example 1) with the exceptions that the N-(Dimethylamino)propylmethacrylamide-dodecylbenzene sulfonic acid salt was prepared in xylene (instead of xylene/butanol/methanol) and the polymerisation was performed in 3.6:1 wt/wt xylene/n-butanol (instead of 1:1 xylene/n-butanol).

This polymer, at 49.5 wt % NVC, was emulsified as illustrated in diagram 1. The quaternary ammonium—sulfonate counterion functional acrylic polymer solution (600 g) and defoaming agent Foamaster NDW (Cognis Corporation) (12 g) were placed in vessel A and stirred at high shear on a Dispermat laboratory high speed disperser. A pre-prepared solution of poly(ethylene oxide)-block-poly(propylene oxide)-block-poly(ethylene oxide) surfactant (emulsifier) (Synperonic PE/F68 manufactured by Uniqema Inc.) (30 g) in water (800 g) was then fed into the polymer mixture over 60 minutes.

A marked drop in viscosity occurred when the system underwent phase inversion from water-in-oil to oil-in-water emulsion. The emulsion was stirred for 1 minute after the feed end then left to stand for at least 1 hour for any foam to subside. Then it was passed through an 80 µm nylon mesh.

This emulsion (1,200 g) was then placed into a four necked flange top flask equipped with a mechanically-driven anchor stirrer, electronic temperature controller and probe and a still-head/condenser/receiver set-up. The flask and contents were weighed before the start of the distillation so that the course of the distillation could be monitored by weight at intervals.

The emulsion was stirred at a moderate speed and heated to 40° C. Vacuum was then gradually applied until a steady rate of distillation was observed.

The final emulsion, after removal of 25.1% of the initial total mass as distilled water/solvent mix, was allowed to cool. Non volatile content was determined, by the method of IS03251, as 31.9 wt % (theoretical 31.7%). VOC was calculated to be 130 g/kg. Particle size was determined by optical microscopy of the diluted emulsion to be substantially in the range of 0.5-5 µm. Viscosity was determined by ICI Cone & Plate viscometer to be 0.32 poise. The emulsion had a milky white opaque appearance.

Coating Preparation Example 1

The emulsion of Emulsion Preparation Example 1 was incorporated into a coating, having the composition shown in Table 1, by means of mixing in a Dispermat high speed disperser in the order shown.

TABLE 1

Coating Preparation 1

| Component | Function | Wt % | Dfv %* |
|---|---|---|---|
| Water | Continuous phase | 19.5 | 0 |
| Bentone LT (Elementis Specialties) | Thickener | 0.3 | 0.9 |
| Pluronic 3500 (BASF Aktiengesellschaft) | Pigment dispersing agent | 0.4 | 2.2 |
| Foamaster NDW (Cognis Corporation) | Defoaming agent | 0.15 | 0.9 |
| Copper Omadine (Arch Chemicals Inc.) | Biocidal pigment | 3.0 | 9.1 |
| Larvik Zinc Oxide (Umicore Norway AS) | Filler pigment | 9.3 | 9.1 |
| Copper Oxide Lolo Tint LM (American Chemet Corp.) | Biocidal pigment | 30.25 | 27.8 |
| Emulsion of Emulsion Preparation Example 1 | Dispersed binder | 37.1 | 50.0 |

*dry film volume %

The ICI cone and plate viscosity of this paint was 0.35 poise. The calculated VOC of this coating (78 g/l) compares well to that of typical solvent-borne SPC systems (~400 g/l).

Coating Preparation Example 2

The emulsion of Emulsion Preparation Example 2 was incorporated into a coating, having the composition shown in Table 2, by means of mixing in a Dispermat high speed disperser in the order shown.

TABLE 2

Coating Preparation 2

| Component | Function | Wt % | Dfv %* |
|---|---|---|---|
| Water | Continuous phase | 18.9 | 0 |
| Bentone LT (Elementis Specialties) | Thickener | 0.3 | 0.9 |
| Pluronic 3500 (BASF Aktiengesellschaft) | Pigment dispersing agent | 0.4 | 2.1 |
| Foamaster NDW (Cognis Corporation) | Defoaming agent | 0.1 | 0.9 |
| Acrysol RM825 (Rohm and Haas/Dow Chemical Company) | HEUR associative thickener | 0.8 | 0.7 |
| Copper Omadine (Arch Chemicals Inc.) | Biocidal pigment | 3.0 | 9.0 |
| Larvik Zinc Oxide (Umicore Norway AS) | Filler pigment | 9.2 | 9.0 |
| Copper Oxide Lolo Tint LM (American Chemet Corp.) | Biocidal pigment | 30.0 | 27.4 |
| Texanol Ester Alcohol (Eastman Chemical Co.) | Coalescing agent | 0.6 | 0 |
| Propane 1,2 diol | Co-solvent/freeze-thaw stabiliser | 3.3 | 0 |
| Emulsion of Emulsion Preparation Example 2 | Dispersed binder | 33.4 | 50.0 |

*dry film volume %

The ICI cone and plate viscosity of this paint was 0.80 poise. Pigment grind was found to be around 40 µm by optical microscopy of thin dried paint films. The calculated VOC of this coating (115 g/l) compares well to that of typical organic solvent-borne SPC systems (~400 g/l).

Coating Preparation Comparative Example

A solvent-borne coating was prepared based on the polymer (before emulsification) of Emulsion Preparation Example 1 above. The paint is based on an equivalent polymer content and equivalent levels of biocidal pigments as coating Preparation Example 1 above. The coating composition is shown in Table 3. The paint was prepared by means of mixing in a Dispermat high speed disperser in the order shown.

TABLE 3

Coating Preparation Comparative Example

| Component | Function | Wt % | Dfv %* |
|---|---|---|---|
| Polymer (before emulsification) of Emulsion Preparation Example 1 | Continuous phase | 12.4 | 19.8 |
| Cereclor 48 (Ineos Chlor Ltd) | Plasticiser | 0.9 | 3.1 |
| Copper Omadine (Arch Chemicals Inc.) | Biocidal pigment | 3.9 | 9.1 |
| Larvik Zinc Oxide (Umicore Norway AS) | Filler pigment | 12.2 | 9.1 |
| Polymer (before emulsification) of Emulsion Preparation Example 1 | Continuous phase | 18.9 | 30.2 |
| Copper Oxide Lolo Tint LM (American Chemet Corp.) | Biocidal pigment | 39.6 | 27.8 |
| Disparlon A600-20X (Kusumoto Chemicals Ltd) | Thickener/thixotrope | 1.2 | 0.9 |
| Xylene | Solvent | 10.9 | 0 |

This coating has VOC 500 g/l (calculated).

Coating Test Results

As a test of antifouling performance the Coatings Preparations Examples 1 and 2 were each applied to plywood boards which had been pre-painted with a commercial anti-corrosive primer (Intertuf 203, International Paint) and the boards were immersed in the sea at Changi Yacht Club, Singapore.

The paint films were periodically assessed for settlement of marine fouling organisms. Fouling coverage was assessed in four main ecologically derived fouling categories: microfouling, weed, soft-bodied animal, and hard-bodied animal, and analysis was carried out visually on these four fouling categories, as this provided sufficient information to differentiate between coating performances. The results for 12 months immersion at the Singapore test site are shown in Table 4 below. This demonstrates that the waterborne coating performs better, with respect to weed fouling, than the solvent-borne comparative example, and it performs similarly to a standard commercial (solvent-borne) antifouling.

TABLE 4

| | % microfouling | % weed | % soft bodied animal | % hard bodied animal |
|---|---|---|---|---|
| Coating preparation example 1 (waterborne) | 99 | 0 | 0 | 1 |
| Coating preparation comparative example (solvent-borne) | 60 | 35 | 0 | 5 |
| Standard: commercial copper acrylate based antifouling* (solvent-borne) | 97 | 0 | 0 | 3 |
| Control: commercial marine primer coat‡ | 17 | 0 | 32 | 51 |

*Intersmooth BEA468 - International Paint Ltd,
‡Intertuf JVA202 - International Paint Ltd The results of a further trial (6 months at Singapore immersion site) are given in Table 5 below. This demonstrates that the waterborne systems show low levels of fouling after this time period of exposure, which is comparable to the solvent-borne comparative example and to the commercial copper acrylate system.

TABLE 5

| | % microfouling | % weed | % soft bodied animal | % hard bodied animal |
|---|---|---|---|---|
| Coating preparation example 1 (waterborne) | 55 | 0 | 0 | 1 |
| Coating preparation example 2 (waterborne) | 48 | 0 | 0 | 0 |
| Coating preparation comparative example (solvent-borne) | 38 | 0 | 0 | 0 |
| Standard: commercial copper acrylate based antifouling* (solvent-borne) | 32 | 0 | 0 | 0 |
| Control: commercial marine primer coat‡ | 13 | 0 | 14 | 58 |

*Intersmooth BEA757 - International Paint Ltd,
‡Intertuf JVA202 - International Paint Ltd As an indication of self-polishing performance, the coatings were tested on a rotating disc apparatus of the type described in GB-A-1457590 (FIGS. 7a and 7b therein) and the film thickness measured before and after rotation in sea water over 186 days. The results are given in Table 6 below: the values given are loss of film thickness in microns. Initial dry film thickness was 50-70 μm. The found polishing rate of ~4 μm per month is typical of commercial antifouling systems.

TABLE 6

| | Film thickness loss |
|---|---|
| Coating preparation example 1 (waterborne) | 27 |
| Coating preparation comparative example (solvent-borne) | 25 |

Polishing properties are similar to those of the solvent-borne equivalent coating. This was an unexpected result as it would be expected that the presence of hydrophilic emulsifier and pigment dispersing agents in the waterborne system would act to increase polishing rate.

In order to test the mechanical integrity of the paints when subjected to wet-dry cycling, the coating preparation example 1 (waterborne) and the coating preparation comparative example (solvent-borne) were applied to steel panels which had been primed with anticorrosive primer (Intertuf 203, International Paint). After drying, these panels were fully immersed in seawater (25° C.) for 7 days then cycled between partial immersion in 35° C. seawater (24 hours) and exposure (unimmersed) to −5° C. (24 hours). Both coatings showed no loss of film integrity (no development of cracks or detachment) during the period of cycling (8 cycles) suggesting that film properties of the waterborne paint are similar to those of the solvent-borne equivalent coating. This was an unexpected result as it would be expected that the presence of the emulsifier and pigment dispersing agents in the waterborne system would act to compromise film properties due to enhanced hydrophilicity leading to greater ingress of water during the immersion part of the cycle leading to greater film internal stress.

Comparative Example

In order to compare the properties of the antifouling compositions disclosed in JP 2007023243 with antifouling compositions prepared according to the first aspect of the invention, we prepared Examples P1 and P3 exactly as described in paragraphs [0076] and [0078] of JP 2007023243. In both cases, a water-in-oil emulsion was prepared but was found to be unstable on storage overnight at ambient temperature. It was therefore not possible to proceed with paint formulation and testing.

The invention claimed is:

1. A process for making a water-based antifouling coating composition comprising the following steps:
    a) preparing a binder polymer in an organic solvent;
    b) emulsifying the binder polymer and the organic solvent into water to produce an oil-in-water emulsion;
    c) removing part of the organic solvent from the emulsion; and
    d) formulating the emulsion into a water-based anti-fouling coating composition;
    wherein the binder polymer is a metal acrylate self-polishing copolymer.

2. The process according to claim 1, wherein the metal acrylate self-polishing copolymer is a zinc acrylate copolymer or a copper acrylate copolymer.

3. The process according to claim 1, further comprising adding at least one of an emulsifier or a surfactant prior to or during the emulsifying step b).

4. The process according to claim 1, wherein part of the organic solvent is removed from the emulsion through distillation under partial vacuum.

5. The process according to claim 1, wherein the water based anti-fouling coating composition comprises biocidal components.

6. An antifouling coating composition obtained by the process according to claim 1, the antifouling coating composition comprising an oil-in-water emulsion, wherein the oil phase of the oil-in-water emulsion is a metal acrylate self-polishing copolymer in an organic solvent.

7. The antifouling coating composition of claim 6 having a VOC level below 250 g/l.

8. A method of coating a substrate comprising coating the substrate with the antifouling coating composition of claim 6.

9. The process according to claim 3, wherein prior to or during the emulsifying step (b) a compound is added selected from the group consisting of poly(ethylene oxide)-block-poly(propylene oxide)-block-poly(ethylene oxide) polymers, polysorbate surfactants, aliphatic ethers of poly(ethylene oxide), carboxylic acid functional polymeric surfactants, anionic sulfate or sulfonate functional surfactants, and acetylenic diol surfactants.

10. The process according to claim 3, wherein prior to or during the emulsifying step (b) a compound is added selected from the group consisting of poly(ethylene oxide)-block-poly(propylene oxide)-block-poly(ethylene oxide) polymers.

11. The process according to claim 1, wherein the organic solvent is removed to such an extent that the antifouling coating composition has a VOC level below 250 g/l.

12. The process according to claim 1, wherein the organic solvent is removed to such an extent that the antifouling coating composition has a VOC level below 200 g/l.

13. The process according to claim 1, wherein the organic solvent is removed to such an extent that the antifouling coating composition has a VOC level below 150 g/l.

14. The process according to claim 1, wherein the organic solvent is removed to such an extent that the antifouling coating composition has a VOC level below 125 g/l.

15. The antifouling coating composition of claim 6 having a VOC level below 200 g/l.

16. The antifouling coating composition of claim 6 having a VOC level below 150 g/l.

17. The antifouling coating composition of claim 6 having a VOC level below 125 g/l.

\* \* \* \* \*